United States Patent [19]

Weck et al.

[11] Patent Number: 4,492,513

[45] Date of Patent: Jan. 8, 1985

[54] WORKPIECE MANIPULATION SYSTEM

[75] Inventors: Manfred Weck, Aachen; Hans Klingel, Möglingen; Georg Werntze, Hopfen, all of Fed. Rep. of Germany

[73] Assignee: Maho Werkzeugmaschinenbau Babel & Co., Fed. Rep. of Germany

[21] Appl. No.: 385,835

[22] Filed: Jun. 7, 1982

[30] Foreign Application Priority Data

Jun. 10, 1981 [DE] Fed. Rep. of Germany ....... 3123029

[51] Int. Cl.$^3$ ............................................. B23Q 7/04
[52] U.S. Cl. ..................................... 414/729; 29/423; 901/31; 901/50
[58] Field of Search ............ 414/729; 425/DIG. 109; 29/423, 418; 156/539, 556; 294/89, 74; 901/31, 39, 50

[56] References Cited

U.S. PATENT DOCUMENTS

| | | | |
|---|---|---|---|
| 3,702,703 | 11/1972 | Du Bois | 294/89 X |
| 4,074,519 | 2/1978 | Garrett | 294/89 X |
| 4,130,921 | 12/1978 | Wallshein | 29/423 X |

FOREIGN PATENT DOCUMENTS 1957608  6/1970  Fed. Rep. of Germany .

*Primary Examiner*—Robert J. Spar
*Assistant Examiner*—Terrance L. Siemens
*Attorney, Agent, or Firm*—Kenway & Jenney

[57] ABSTRACT

The invention relates to a manipulation system for workpieces, in which the individual workpieces are gripped by manipulator gripping arms and transported to predetermined locations in processing and/or magazine stations. For permitting a technically simple manipulation and transport of workpieces of different shapes by the use of tongs as gripping tools provided at the gripping arms, the invention provides that to an easily accessible wall of the respective workpiece a handling member is secured which is so designed and arranged as to permit the tongs to engage this handling member for transporting the workpiece e.g. from a magazine to the machine tool. Suitably, this handling member is in the form of a hollow pin which with an enlarged base is bonded to the workpiece and, after processing, may be knocked off or separated from the workpiece in some other manner.

2 Claims, 2 Drawing Figures

WORKPIECE MANIPULATION SYSTEM

The invention relates to a workpiece manipulation system, in which the individual workpieces are gripped by gripping arms of manipulators and transported to predetermined positions in processing and/or magazine stations.

In the automation of processing operations in machine tools the transport of the workpieces as well as their supply to and discharge from the individual processing stations of one or more machine tools poses a considerable problem which so far has been solved only with extraordinarily high technical expenditure. The difficulties mainly were due to the diversity of the shapes of different workpieces, which are series-processed on the machine tools. This difference in shape of the workpieces has required extraordinarily complex gripping tools at the arms of the manipulators as well as complex control means, since for each workpiece series the automatic operation has required a separate control program for the movements of the manipulators and their gripping arms, respectively. Special problems have arisen in so-called "ghost-processing", i.e. when the entire processing steps not only of one machine tool but of several machine tools integrated in a processing system as well as the supply and discharge of the workpieces including one or several temporary storage operations are to be fully automatic and self-monitored.

It is the object of the invention to provide a workpiece manipulation and transport system of the above-mentioned species which permits the use of structurally and functionally simple workpiece gripping tools having the most varied shapes. According to the invention, this object is solved in that each workpiece has a handling member detachably secured thereto for engagement by the gripping tool, which is in the form of tongs.

The invention permits construction of the gripping tools of the manipulators as simple tongs which, regardless of the respective shape and size of the various workpieces ensure a reliable support of the workpieces during transport and the various depositing operations, respectively. The handling members, which are of simple design, are detachably secured to easily accessible outer surfaces of the individual workpieces at predetermined locations, which may advantageously be done by bonding. During the various processing cycles, they are fixedly joined to the respective workpiece, and they are separated from the workpiece, e.g. by knocking-off, only after termination of all processing operations.

The manipulation and transport system according to the invention is particularly suited for machining of workpieces in a plurality of processing centers within a processing processing line, in which, due to the special mode of operation of the workpiece clamping means, the demands as to the supply and deposition of workpieces are not excessively high, since the exact positioning and alignment of the workpieces are carried out by the clamping device of the machine itself.

The respective handling members may be designed in the most varied manner, e.g. they may be in the form of hooks, pins or profiled members. However, a handling member in the form of a hollow pin which with an enlarged flat base is bonded to the respective suitable surface of the workpiece has proven to be particularly advantageous, wherein the interior of the hollow pin is intended to receive an adhesive. For ensuring a strong and reliable support of the individual workpieces at the gripping tool, which is in the form of tongs, the pins are provided with a narrow central portion having one or more annular flanges as well as with an enlarged head. This embodiment provides for a positive engagement between the tong jaws and the respective pin, thereby permitting a reliable and secure guidance even when the movement of the manipulator gripping arm is changed abruptly.

An embodiment of the present invention will be described by way of example only with reference to the accompanying drawings in which.

Figure 1:
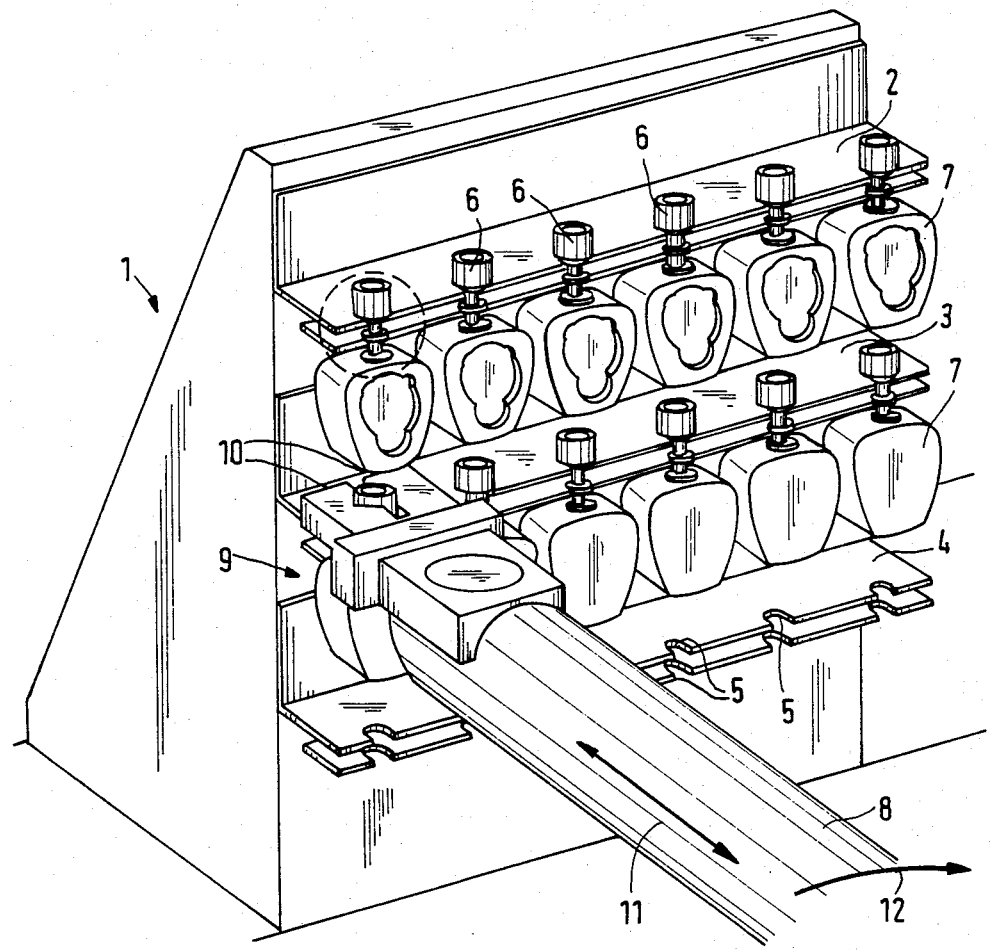
FIG. 1 is a perspective view of a multiplicity of workpieces comprising handling members secured thereto and deposited in a magazine, wherein a gripping arm of the manipulator is also shown.

As is shown by FIG. 1, three rows of workpiece holders 2, 3, 4 in the form of spaced twin plates are disposed in a magazine 1. These workpiece holders 2, 3, 4 have a multiplicity of recesses 5 open at one side for suspending the workpieces 7, which are secured to pins 6. The gripping arm 8 of a manipulator (not illustrated) supports at its front end gripping tongs 9, the two gripping jaws 10 of which enclose the pin protruding from the surface of the workpiece 7 on either side. This gripping arm 8 of the manipulator is movable in the direction of the arrows 11, 12 and may thus remove the workpieces 7 together with the pins 6 bonded thereto from the magazine 1 and transport them to further processing and storage stations, respectively.

Figure 2:
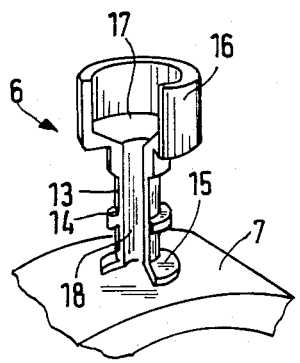
FIG. 2 is a longitudinal sectional view of a pin bonded to the surface of a workpiece.

Each of the pins 6, which are shown in detail in FIG. 2, comprises a narrow central portion 13 including an annular flange 14 as well as a disc-shaped base 15 and an enlarged hollow-cylindrical head 16. The interior 17 of the pins 6 is intended to receive a suitable adhesive, e.g. a thermosetting plastic material 18. The lower surface of the disc-shaped base 15 e.g. has an inwardly curved shape to permit a sufficient amount of adhesive to penetrate from the pin interior 17 into the space between this curved base surface and the surface of the workpiece 7 so as to ensure a reliable and, at the same time, a releasable bond between the pin 6 and the workpiece 7 even when the workpiece surface is uneven.

For securing a pin 6, which is shown in detail in FIG. 2, to the surface of the workpiece 7, the thermosetting plastics material is injected into the interior of the pin placed onto the surface of the workpiece 7 by means of a gun, wherein the adhesive is so selected as regards its adhesive properties and its consistency as to set after a few seconds and to establish a reliable bond between the pin 6 and the workpiece 7. However, it is possible to use the interior of the pin 6 as an adhesive reservoir to permit repeated use of the pin for workpieces of different nature without any previous cleaning treatment; a suitable adhesive for this purpose is a thermoplastic which by simple heating of the pin regains its flowability and simultaneously its adhesiveness.

When the workpieces 7 have passed through various stations and processing operations, the pins 6 must be removed from the finished parts. This is simply done by a sideways knock on the pin, by which the adhesive bond is separated. Depending on the properties of the adhesives, the pins 6 may also be separated from the workpieces 7 in some other manner, e.g. by brief heating or by supplying a solvent.

What is claimed is:

1. A workpiece manipulator, in combination with workpieces that are gripped by gripping means provided at the loading arm of and manipulator and are transported to predetermined positions of processing and/or magazine stations the workpieces comprising a detachable handling member having an enlarged hollow head (16), a relatively narrow hollow central portion (13) and an enlarged base (15), said base being curved inwardly toward said narrow central portion, the interior of said hollow head forming a relatively large reservoir for adhesive (18) and said narrow central portion and said base having a relatively small opening formed therethrough in communication with said reservoir whereby said adhesive may contact said workpiece to secure said handling member for gripping by said gripping means.

2. A manipulator according to claim 1, wherein said adhesive (18) provided in the opening of said base and said hollow pin and said reservoir is a thermosetting plastic material.

* * * * *